June 26, 1962

B. O. HEATH 3,041,016

ARRANGEMENT OF JET PROPULSION ENGINES AND
UNDERCARRIAGES IN AIRCRAFT

Filed Sept. 25, 1959

Inventor:
Bernard Oliver Heath
By:
Stevens, Davis, Miller & Mosher
Attorneys

United States Patent Office 3,041,016
Patented June 26, 1962

3,041,016
ARRANGEMENT OF JET PROPULSION ENGINES AND UNDERCARRIAGES IN AIRCRAFT
Bernard Oliver Heath, Lea, near Preston, England, assignor to The English Electric Company Limited, London, England, a British company
Filed Sept. 25, 1959, Ser. No. 842,471
Claims priority, application Great Britain Oct. 14, 1958
3 Claims. (Cl. 244—54)

This invention relates to an arrangement of jet propulsion engines and undercarriages in aircraft.

Aircraft turbo jet engines are large in size and for operational purposes are preferably placed near the longitudinal axis of the aircraft to avoid asymmetry when flying on less than the full complement of engines. They are also preferably placed towards the rear of the aircraft so that their jet pipes may extend from the tail end of the aircraft, the jet efflux thereby avoiding aerodynamic and thermodynamic interference with flying surfaces at the rear of the aircraft. To achieve this desirable operational position for the engines in a high performance aircraft where weight and overall volume of the machine need to be kept to a minimum, the engines are placed within the main fuselage of the aircraft.

This positioning, however, creates a structural problem since it is necessary to be able to remove an engine as a complete unit from the aircraft for overhaul and servicing purposes and the large hatch normally necessary in the fuselage for this purpose constitutes an additional structural complication and weight penalty.

The object of the invention is to provide an improved arrangement of engines and undercarriage for aircraft with a minimum of hatches.

In accordance with the invention an aircraft fuselage is so arranged that the main wheels of the undercarriage of the aircraft when in the up-position fold into a compartment in the fuselage immediately below the engine or engines, the undercarriage doors completing the fuselage and hatch compartment thereof. In the down-position of the undercarriage the compartment vacated by the said undercarriage provides access to the engine or engines for servicing and enables them to be withdrawn from the fuselage downwards between the undercarriage legs without the necessity for opening an additional main hatch in the fuselage through which to withdraw them. Joints are provided between the jet engines proper and their jet pipes and intake pipes. This arrangement allows the withdrawal of the engines without disturbing said pipes and enables the same reinforcement of the fuselage structure to be used both for engine access and undercarriage stowage with consequent weight saving.

Since the stowed undercarriage does not occupy the whole compartment below the engine, the additional space therein may be used for detachable equipment such as auxiliary fuel tanks, armament packs or boosting motors such as a rocket motor pack.

In order that the invention may be clearly understood and readily carried into effect, an embodiment thereof will now be described with reference to the accompanying drawing, in which.

Figure 1:
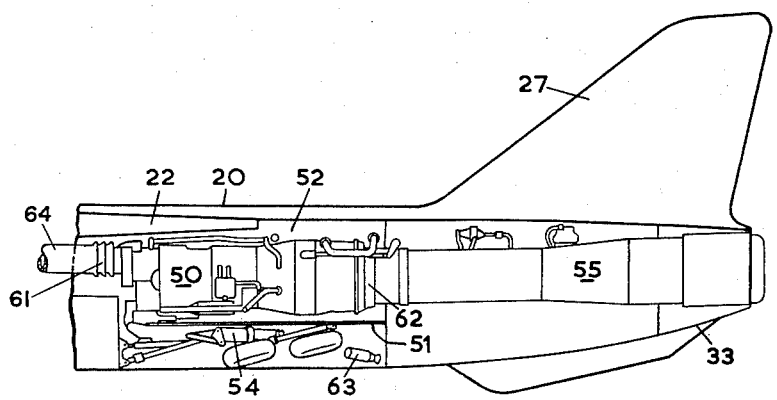
FIG. 1 is a diagrammatic sectional elevation.

In the centre fuselage 20 of an aircraft which carries a wing 22 and a fin 27 on its back, and a rear fairing 33 at its rear end, two turbo jet propulsion engines 50 are mounted side by side so as to discharge their propulsive jets through jet pipes 55 emerging from the fuselage 20 through the rear fairing 33. Joints 61 and 62 connect the air inlet 64 to jet propulsion engine 50, and the combustion gas outlets therefrom to air intakes in the fuselage 20 and to the said jet pipes 55, respectively.

Under the engines, which are separated from one another by a firewall 52 there are arranged a starboard and a port engine floor 51. In the bay of the fuselage 20 underneath the said engine floors 51, the main undercarriage 54 is arranged, which in FIG. 1 is shown retracted backward into said bay, and in FIG. 2 extended in the position to carry the aircraft on the ground. The said bay is closed, in the retracted position of the main undercarriage 54, by the starboard and port undercarriage doors 53, which are longitudinally hinged to the fuselage 20.

Figure 2:
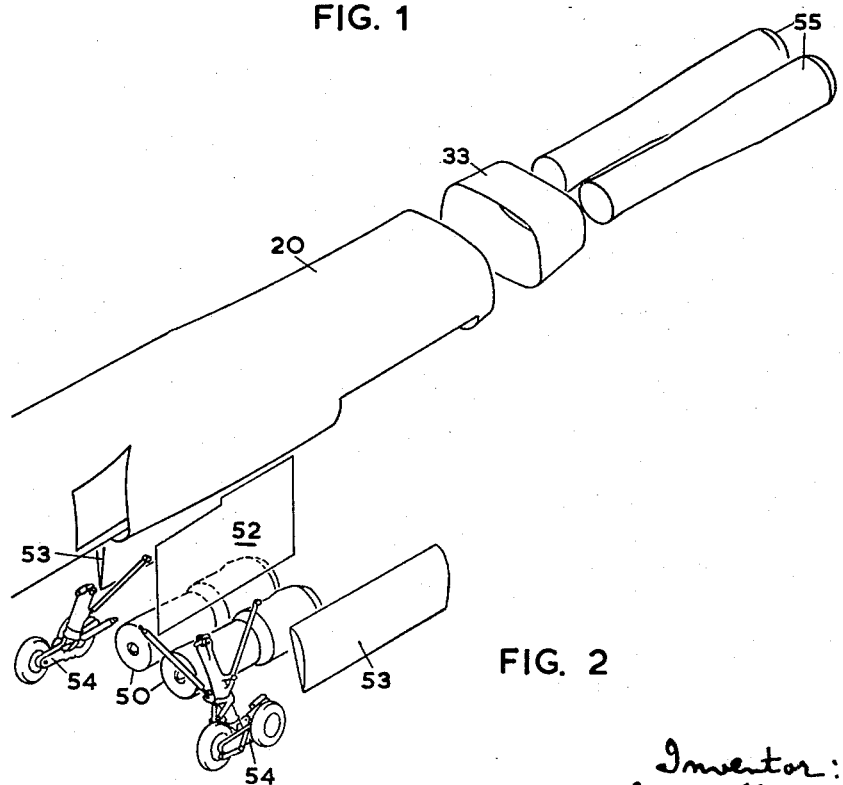
FIG. 2 is a diagrammatic perspective exploded view of the rear portion of the fuselage of an aircraft according to the present invention.

As will be seen from FIG. 2, the legs of the main undercarriage 54 are in the lowered position thereof spaced apart so far that the jet propulsion engines 50 can be lowered or raised through the open hatch for replacement or maintenance, after the joints 61 and 62 have been disconnected.

As will be seen from FIG. 1, the main undercarriage 54 is shorter than the jet propulsion engines 50, leaving sufficient space at the rear of the hatch for the installation of a rocket motor pack 63.

Preferably a pair of rocket motors will be used with their axes converging in plan and inclined in elevation, so as to pass through the centre of gravity of the aircraft which may lie close to the forward ends of the jet propulsion engines 50. The rocket motor pack 63 may remain in position during the normal operational condition of the aircraft, but may be readily removed for its own replacement by another rocket motor pack or other auxiliary equipment of the aircraft, and preparatory to the removal of the turbo jet propulsion engines 50.

What I claim as my invention and desire to secure by Letters Patent, is:

1. An aircraft comprising in combination: a fuselage, a jet propulsion engine mounted in the said fuselage above a bay in the said fuselage, a main undercarriage mounted on the said fuselage retractable backward into the said bay and having two legs spaced apart from one another in the down-position and allowing insertion into the fuselage of the said engine between said legs from below and the withdrawal of the said engine from the fuselage through the said bay and between said legs.

2. An aircraft as claimed in claim 1, comprising an air intake duct and a jet pipe mounted in the said fuselage fore and aft of the said jet propulsion engine, respectively, and detachable pipe joints between the said jet propulsion engine and the said air intake duct and jet pipe, respectively, allowing the withdrawal of the said engine through the said bay independently of the said air intake duct and jet pipe remaining in said fuselage.

3. An aircraft as claimed in claim 1, comprising a detachable rocket motor pack mounted in the space of the said bay not occupied by the said undercarriage in its up-position.

References Cited in the file of this patent

UNITED STATES PATENTS

| 2,506,976 | Tharratt | May 9, 1950 |
| 2,640,317 | Fentress | June 2, 1953 |

FOREIGN PATENTS

| 755,288 | Great Britain | Aug. 22, 1956 |

OTHER REFERENCES

Jane's All the World's Aircraft, 1957–58, pages 268 and 269.